United States Patent [19]

Grögler et al.

[11] 4,442,280
[45] Apr. 10, 1984

[54] HETEROGENEOUS SYSTEMS OF POLYOL/DIPHENYL METHANE URETDIONE DIISOCYANATES AND A PROCESS FOR THEIR PRODUCTION

[75] Inventors: Gerhard Grögler, Leverkusen; Wilhelm Kallert, Cologne, both of Fed. Rep. of Germany

[73] Assignee: Bayer Aktiengesellschaft, Leverkusen, Fed. Rep. of Germany

[21] Appl. No.: 404,010

[22] Filed: Aug. 2, 1982

[30] Foreign Application Priority Data

Aug. 12, 1981 [DE] Fed. Rep. of Germany ....... 3131780

[51] Int. Cl.³ ..................... C08G 18/77; C08G 18/79; C08G 18/24; C08G 18/26
[52] U.S. Cl. ........................ 528/54; 252/182; 264/328.1; 264/331.16; 521/55; 521/58; 521/160; 521/161; 528/73; 528/503
[58] Field of Search ............................. 521/160, 161; 528/54 OR, 55, 58, 73, 503

[56] References Cited

U.S. PATENT DOCUMENTS

| | | | |
|---|---|---|---|
| 3,248,370 | 4/1966 | Reischl et al. | 260/75 |
| 3,475,200 | 10/1969 | Kallert et al. | 117/94 |
| 3,793,238 | 12/1974 | Winkelmann et al. | 260/2.5 AY |
| 3,997,794 | 12/1976 | York et al. | 250/505 |
| 3,998,794 | 12/1976 | Müller et al. | 260/77.5 AM |
| 4,022,752 | 5/1977 | Horn et al. | 260/45.75 B |
| 4,044,171 | 8/1977 | Müeller et al. | 427/27 |
| 4,251,427 | 2/1981 | Recker et al. | 260/37 N |
| 4,251,428 | 2/1981 | Recker et al. | 260/37 N |

FOREIGN PATENT DOCUMENTS

| | | |
|---|---|---|
| 952940 | 10/1956 | Fed. Rep. of Germany . |
| 2312391 | 3/1973 | Fed. Rep. of Germany ........ 528/73 |
| 783564 | 9/1957 | United Kingdom . |
| 802189 | 10/1958 | United Kingdom . |
| 1068016 | 5/1967 | United Kingdom . |
| 1078525 | 8/1967 | United Kingdom . |
| 1134285 | 11/1968 | United Kingdom . |
| 1207673 | 10/1970 | United Kingdom . |
| 1488631 | 10/1977 | United Kingdom . |

*Primary Examiner*—H. S. Cockeram
*Attorney, Agent, or Firm*—Gene Harsh; Joseph C. Gil; Lyndanne M. Whalen

[57] ABSTRACT

Storage stable heterogeneous systems which may be processed at low temperatures to form polyurethanes are made by mixing a specific quantity of a high molecular weight polyhydroxyl compound with a specified quantity of a 4,4'-diphenyl methane uret dione diisocyanate corresponding to a specified formula or a corresponding modified diisocyanate. A lead and/or tin catalyst is also included.

29 Claims, No Drawings
}

HETEROGENEOUS SYSTEMS OF POLYOL/DIPHENYL METHANE URETDIONE DIISOCYANATES AND A PROCESS FOR THEIR PRODUCTION

BACKGROUND OF THE INVENTION

This invention relates to low molecular weight heterogeneous systems which harden to form polyurethanes when heated. These systems which may be fluid, paste like or readily fusible have a long shelf life and are based on polyhydroxyl compounds and 4,4'-diphenyl methane uret dione diisocyanates in dimeric and/or oligomeric form. Lead and/or tin catalysts may be employed. This invention also relates to a process for the production of such systems.

The use of isocyanates containing uret dione groups for the production of polyurethane plastics is known in the art. German Patent No. 1,014,740 for example, discloses that an NCO-prepolymer may be prepared from a polyester containing terminal hydroxyl groups and an excess of uret dione diisocyanate (for example dimeric tolylene diisocyanate). Subsequently, diols or triols, water, aromatic diamines, hydroxy polyesters or polyethers may be introduced into and mixed with the NCO-prepolymer. Crosslinking is accomplished by exposing the product to an elevated temperature.

It is also known that a storable polyurethane may be prepared from a relatively high molecular weight polyhydroxyl compound, glycol and stoichiometric quantities of diisocyanate and a uret dione diisocyanate. Polyurethanes containing OH-groups are first prepared from the polyhydroxyl compound, glycol and substoichiometric quantities of diisocyanates. Subsequently, the uret dione is introduced into and mixed with these polyurethanes containing OH-groups by any of the methods known and used by those skilled in the art of rubber chemistry. The mixture thus obtained is relatively stable in storage and forms a significantly, crosslinked, highly elastic material only after being heated to 100°–180° C. at which temperature the uret dione group reacts with the OH and/or urethane groups (See German Patent No. 968,566).

According to German Patent No. 952,940, a uret dione diisocyanate may be introduced into a polyurethane and mixed on rubber mixing rolls. The disclosed polyurethane contains terminal aromatic amino groups which polyurethane is produced from a relatively high molecular weight polyhydroxyl compound, aromatic diamines and substoichiometric quantities of aromatic diisocyanates. These polyurethane forming reactants are used in quantities such that free NCO-groups (based on the terminal amino groups) are present and an overall excess of isocyanate is obtained when the uret dione ring is opened by heating. By virtue of this excess of isocyanate, crosslinking accompanied by splitting of the uret dione ring occurs at temperatures above 100° C.

It is also known that relatively high molecular weight polyhydroxyl compounds (such as polyesters or polyethers) and optionally difunctional chain extending agents (such as glycols) can be reacted in the melt with uret dione diisocyanates (dimeric 2,4-diisocyanatotoluene) or with mixtures of uret dione diisocyanates and other diisocyanates (such as 4,4'-diisocyanatodiphenylmethane) at temperatures below 100° C. Such reactants are typically employed in quantities such that virtually all of the free NCO-groups of the diisocyanates are consumed by the reactive hydrogen atoms of the other reactants. The product is a storable, high molecular weight, substantially uncrosslinked polyurethane composition which may be converted into crosslinked polyurethanes by prolonged heating at temperatures above 100° C. to react the uret dione group with, for example, urethane groups (see German Patent No. 1,153,900).

German Offenlegungsschrift No. 2,502,934 teaches that a polyisocyanate containing uret dione groups may be reacted with less than stoichiometric quantities (based on free NCO-groups) of a chain extending agent having a molecular weight in the range from 18 to 300 and containing from 2 to 3 NCO-reactive groups. The product of this reaction is converted by reaction with a blocking agent having a functionality of one into the corresponding compounds containing uret dione groups, and blocked isocyanate groups as well as urethane groups and/or reactive hydrogen atoms in the chain. The compounds thus obtained are reacted with a polyhydroxyl compound to produce polyurethane plastics by the isocyanate polyaddition process.

Addition compounds containing uret dione groups obtained from uret dione diisocyanates and NCO-reactive compounds are also described in German Publication No. 2,420,475, British Pat. No. 783,564, French Pat. No. 1,430,508, Belgian Patent No. 659,576, German Offenlegungs-schrift No. 2,221,170 and French Patent No. 1,471,610. In each of these patent specifications, the end product is hardened by crosslinking the compounds containing active hydrogen atoms and the incorporated uret dione ring and splitting the uret dione ring. Temperatures above 100° C., generally above 140° C. and, in some cases, up to 250° C. are described as appropriate. Very long thermal processing times at high temperatures is necessary in some of these cases in order to complete hardening and to obtain the final properties required. The products containing uret dione groups made in accordance with these known procedures are generally based on dimeric diisocyanatotoluenes. These products are high molecular weight, thermoplastic intermediate products containing incorporated reactive groups (uret dione ring/H-active compound) even before they are completely hardened.

Only at a relatively high temperature (i.e. above 140° C.) is the reaction by which the high molecular weight or crosslinked end products are formed takes place accompanied by softening or melting of the relatively high molecular weight urethane intermediates. At such high temperatures, the uret dione ring reacts to such an extent that the reactants initially fixed in the polyurethane matrix come into contact with one another through diffusion and are thus able to undergo polyaddition.

If, however, starting components such as those mentioned above (i.e. dimeric diisocyanatotoluene, polyesters, polyethers with or without low molecular weight chain extending agents) are mixed without preliminary modification (index below 100, based on free NCO-groups), there is an immediate increase in viscosity. Relatively high molecular weight, elastomeric intermediates and high molecular weight products (particularly where catalysts are present) form. These high molecular weight materials can only be processed—if at all—by elaborate techniques (as required e.g. in rubber technology) accompanied by crosslinking of the uret dione groups to form the crosslinked polyurethane. The relatively poor solubility and relatively high melting point (approximately 150° C.) of these high molecular weight uret dione materials makes it difficult to work with them. If, however, dimeric diisocyanatotoluenes are used in combination with polyethers and/or polyesters and, optionally, low molecular weight chain extending agents (index approximately 100, based on free NCO-groups), it is possible to obtain reaction mixtures having a moderate or even relatively long processing time (pot life) at room temperature but these mixtures are no longer storage stable at room temperature under the conditions required for crosslinking (i.e. after addition of the necessary catalysts). Such mixtures are one-component systems characterized by an inadequate shelf life.

German Offenlegungsschrift No. 2,941,051 discloses a process for the production of fiber-reinforced moldings in which a polyurethane composition is produced from a high melting polyisocyanate (for example, dimeric 2,4-tolylene diisocyanate) and a composition containing reactive hydrogen atoms which has a functionality of from 2.5 to 3.5. The latter composition is produced from polyisocyanates, compounds containing from 2 to 8 OH-groups which have a molecular weight of from 300 to 10,000, a chain extending agent containing from 2 to 4 OH-groups, optionally a compound containing from 2 to 4 amino groups or water, and catalysts in the presence of a molecular sieve. However, the reactive components are storable for periods ranging from a few hours to at most a few days. The disclosed compositions are also disadvantageous in that only specially modified polyurethane compositions containing OH-groups may be used as reactants for the high melting diisocyanates.

German Offenlegungsschrift No. 2,921,162 describes fiber-containing molding compositions which are hardenable by heat. The disclosed compositions are made from a special prepolymer containing OH-groups (0.5 to 7% by weight of free OH-groups), from 5 to 20 wt. % urethane groups and optionally up to 2.5 wt. % urea groups, from 0.1 to 5 wt. % activators and, optionally from 1 to 5 wt. % molecular sieve which is hardened with a high melting polyisocyanate (melting point above 100° C.) at a temperature above 90° C. and under a pressure of from 20 to 400 bars. Dimeric tolylene diisocyanate is used as the high melting diisocyanate. Dimeric diphenyl methane diisocyanate may also be used. The molding compositions have a storage life of at least 10 days. However, the urethane-group-containing OH-prepolymer required can only be produced from a plurality of components in selected quantities and with selected functionalities.

German Offenlegungsschrift No. 2,842,805 also describes solvent-free one-component compositions which use a high melting diisocyanate (preferably dimeric tolylene diisocyanate), hydroxyl prepolymers pre-extended by urethane groups which contain dispersed hard urethane segments and, in addition, certain quantities of diamines. Branched polyethers having a functionality of from 2.5 to 3 must be used as the starter components. If the polyaddition reaction is carried out without first pre-extending the relatively high molecular weight polyol, the mixture containing dimeric tolylene diisocyanate is not storage stable if catalysts are used.

German Offenlegungsschrift No. 2,044,838 describes a process for the production of high molecular weight, substantially linear polyurethanes containing uret dione groups and free from NCO-groups. In this process, the relatively high molecular weight polyol, optionally certain chain extending agents and uret dione diisocyanates (for example dimeric tolylene diisocyanate or dimeric diphenyl methane diisocyanate) are reacted in the absence of catalysts in highly polar solvents (such as dimethyl formamide) either at room temperature or at slightly elevated temperatures. The NCO-groups of the dimeric diisocyanate are not storage stable in the highly polar solvent, because they react with the OH-groups in the polyols to form the linear polyurethane. In another step (for example spinning), the polyurethane containing uret dione groups is converted by reaction with aliphatic polyamines at room temperature into a high crosslinked product (for example filaments). In British Pat. No. 1,134,285, dimeric 4,4'-diisocyanato-diphenyl methane is disclosed as part of a one-component system. However, aqueous dispersions of dimeric 4,4'-diisocyanato-diphenyl methane in combination with H-acid compounds are claimed. These dispersions are hardened at 200° C. and are said to be particularly useful for coating purposes (for forming thin films). However, the disclosed products are not defined MDI-uret diones, but instead relatively high molecular weight NCO-containing uret dione diisocyanates modified with urea groups (See Example 37 infra). The disclosed diisocyanates have extremely poor solubility and can only be reacted at temperatures above 200° C. because the uret dione ring is split only under these temperature conditions.

SUMMARY OF THE INVENTION

It is an object of the present invention to provide a low molecular weight, substantially anhydrous heterogeneous system which is storage stable and may be hardened to form a polyurethane upon exposure to heat.

It is also an object of the present invention to provide a low molecular weight, storage stable heterogeneous system which may be processed at low temperatures to form high molecular weight polyurethanes.

It is another object of the present invention to provide a process for the production of a low molecular weight heterogeneous system which is storage stable and which may be hardened to form a polyurethane upon exposure to heat.

These and other objects which will be apparent to those skilled in the art are accomplished by mixing (a) one equivalent of a difunctional or polyfunctional hydroxyl compound having a molecular weight from 1,000 to 10,000 with (b) m (1 to 1.5)+(0.8 to 1.5) NCO-equivalents of (i) a 4,4'-diphenyl methane uret dione diisocyanate corresponding to a specified formula or (ii) a modified 4,4'-diphenyl methane uret dione diisocyanate in the presence of (c) a lead and/or tin catalyst.

DETAILED DESCRIPTION OF THE INVENTION

The present invention relates to low molecular weight, substantially anhydrous, fluid, paste-like or readily fusible, heterogeneous systems hardenable by heat to form polyurethanes. These systems have a long shelf life and are based on 4,4'-diisocyanato-diphenyl methane uret diones corresponding to the formula

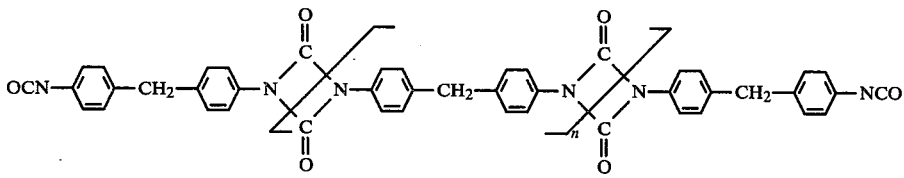

in which n has an average value of from 0 to 2.5 and preferably from 0.1 to 1.5.

Surprisingly, the uret dione containing free NCO-groups and the H-active compounds are both present in this system in the form of a stable two phase or multiphase system. These heterogeneous reactive systems may be applied by casting or by knife coating They also may be thermoplastically processed at low temperatures or hardened in the presence of certain catalysts at relatively low reaction temperatures (around 100° C. to 140° C.) to form high molecular weight polyurethanes. Surprisingly, the uret dione ring opens to a limited extent, if at all. The diphenyl methane uret dione structure performs the function of "hard segments".

It has surprisingly been found that the very slightly soluble, high melting diphenyl methane uret diones corresponding to the above formula (n=0 to 2.5, preferably 0.1 to 1.5) may be reacted with relatively high molecular weight and/or low molecular weight compounds in the presence of certain catalysts at temperatures from about 100° to 140° C. (preferably in the range from 100° to 120° C.). When particular acid compounds are used, it is possible to obtain high quality polyurethane plastics from the uret diones.

It has also been found that these reaction mixtures of the above-mentioned diphenyl methane uret dione diisocyanates and H-acid compounds have an extremely long storage life at room temperature or slightly elevated temperatures for at least 3 months, even when catalysts for the polyurethane-forming reaction are present.

These discoveries are surprising and are not suggested in the published literature. The diphenyl methane uret dione diisocyanates corresponding to the above-given general formula, particularly the oligomeric uret dione in which n=0.1 to 2.5 (preferably from 0.1 to 1.5), behave differently from dimeric tolylene diisocyanate. Dimeric tolylene diisocyanate generally reacts with its NCO-groups and with the hydroxyl groups of polyhydroxyl compounds (even at room temperature) and very special measures have to be taken to obtain systems with any storage life. Where catalysts are present in the products containing dimeric tolylene diisocyanate, their storage life is reduced even further.

In accordance with the present invention, the diphenyl methane uret dione diisocyanate may be used in the form of the pure dimer of diphenyl methane diisocyanate or preferably in certain forms of the oligomeric diphenyl methane uret diones. It is essential, however, that the oligomeric fractions be within the claimed limits. Relatively high molecular weight oligomers are unsuitable diisocyanate components for the reactive systems of the present invention.

The low molecular weight, heterogeneous systems of the present invention are based on polyhydroxyl compounds, high melting dimeric diisocyanates and, optionally, catalysts. More specifically, these systems contain (a) 1 OH-equivalent of difunctional or polyfunctional, relatively high molecular weight polyhydroxyl compounds having a molecular weight of from 1000 to 10,000, preferably from 1250 to 6000 and, most preferably, from 1500 to 4500; and (b) m (1 to 1.5)+(0.8 to 1.5) NCO-equivalents of (i) 4,4'-diphenyl methane uret dione diisocyanates corresponding to the formula

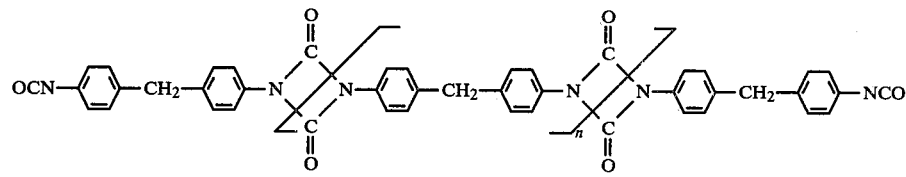

n=0 to 2.5, preferably 0 to 1.5 and, most preferably, 0.1 to 1.5, m=0, or, (ii) 4,4'-diphenyl methane uret dione diisocyanates modified by difunctional or polyfunctional low molecular weight (molecular weights from 62 to 400) compounds containing OH-groups bound to aliphatic and/or cycloaliphatic groups and/or aromatic $NH_2$-groups.

These modified uret dione diisocyanates may be prepared before hand in situ in a suspension of the uret dione diisocyanate and the low molecular weight hydroxy and/or amino compound in the high molecular weight polyhydroxyl compound. These modified uret dione diisocyanates may also be made separately from the uret dione diisocyanate and the low molecular weight hydroxy and/or amino compounds. When the unmodified diisocyanate (b) (i) is used, m should have a value of >0 to 7. When the modified diisocyanate (b) (ii) is used, m OH and/or $NH_2$ equivalents of the low molecular weight modifying compounds should be reacted with m (1 to 1.5)+(0.8 to 1.5) NCO-equivalents of the unmodified diisocyanate (b) (i) in finely powdered form with an average particle size of from 1 to 70 μm (preferably from 1 to 50 μm).

From 0.001 to 5 wt. % preferably from 0.01 to 2 wt. % (based on the sum of high molecular weight polyhydroxyl compound and the uret dione diisocyanate) of a lead and/or tin catalyst, optionally together with other, standard polyurethane catalysts should be employed in the system.

From 0 to 25 wt. %, preferably from 2.5 to 12.5 wt. % (based on the mixture as a whole) of filler-like, finely divided polyadducts of polyisocyanates and at least one relatively low molecular weight compound containing 2 or more NCO-reactive groups and having a molecular weight in the range from 32 to 400, preferably in the range from 62 to 400 may also be included in the system. These finely divided polyadducts should have an average particle size from 1 to 70 μm.

Other auxiliaries and additives of the type commonly used in polyurethane chemistry may also be included in the system of the present invention.

The present invention also relates to a process for producing systems having a long shelf life made from polyhydroxyl compounds, high melting dimeric diisocyanates and a catalyst. More specifically, one equivalent of a difunctional or polyfunctional relatively high molecular weight polyhydroxyl compound having a molecular weight of from 1000 to 10,000 (preferably from 1250 to 6000 and, most preferably, from 1500 to 4500) is mixed with m (1 to 1.5)–(0.8 to 1.5) NCO-equivalents of (i) a 4,4'-diphenyl methane uret dione diisocyanate corresponding to the formula

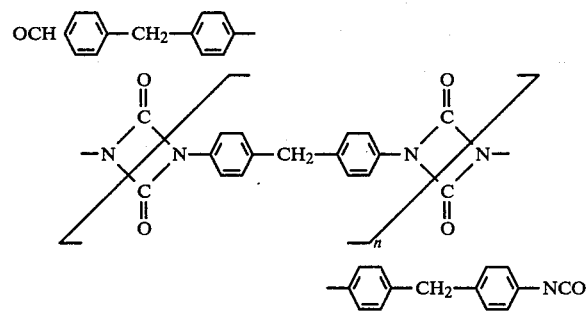

in which
n=0 to 2.5 (preferably 0 to 1.5 and, most preferably, 0.1 to 1.5), or (ii) a 4,4'-diphenyl methane uret dione diisocyanate modified by m-equivalents of a difunctional or polyfunctional, low molecular weight compound containing OH-groups attached to aliphatic or cycloaliphatic groups and/or aromatic NH₂ groups and having a molecular weight of from 62 to 400 for each OH-equivalent of the high molecular weight polyhydroxyl compound.

The modified diisocyanate may be prepared in situ in a dispersion of the uret dione diisocyanate and the low molecular weight hydroxy and/or amino compound in the high molecular weight polyhydroxyl compound. The modified diisocyanate may also be prepared externally from the diisocyanate and hydroxy and/or amino compound. When an unmodified diisocyanate is used m should have a value of greater than 0 to 7. When a modified diisocyanate is used m OH-equivalents and/or NH₂ equivalents of the low molecular weight hydroxy and/or amino compound should be reacted with m (1 to 1.5)+(0.8 to 1.5) NCO-equivalents of the unmodified diisocyanate in finely powdered form (an average particle size of from 1 to 70 μm).

From 0.01 to 5 wt. %, preferably 0.01 to 2 wt % should also be included in the system (based on the sum of the high molecular weight polyhydroxyl compound and the diisocyanate) of a lead and/or tin catalyst, optionally together with other standard polyurethane catalysts.

From 0 to 25 wt. %, preferably from 2.5 to 2.5 wt. % (based on the mixture as a whole) of a filler containing, finely divided polyadduct of a polyisocyanate and at least one relatively low molecular weight compound containing 2 or more NCO-reactive groups and having a molecular weight of from 32 to 400 (preferably a bifunctional compound having a molecular weight of from 62 to 400) may also be included in the systems of the present invention. Other auxiliaries and additives of the type commonly used in polyurethane chemistry may also be used in the process of the present invention.

The storage stable systems of the present invention are useful in the production of heat-hardening polyurethane plastics by heating to temperatures above 100° C., preferably to temperatures in the range from 120° C. to 140° C.

The relatively high molecular weight polyhydroxyl compounds which may be used in the present invention are difunctional or polyfunctional compounds containing from 2 to 8 (preferably from 2 to 4) hydroxyl groups and having a molecular weight of from about 1000 to 10,000, preferably from 1250 to 6000 and, more preferably, from 1500 to 4500. Examples of such compounds are polyesters, polyethers, polythioethers, polyacetals, polycarbonates and polyester amides containing at least two hydroxyl groups and also polybutadiene compounds of the type known to those in the art to be useful for the production of homogeneous, optionally cellular or foam-like polyurethanes. Polyethers are particularly preferred materials although polyesters may also be used.

The polyethers suitable for use in the present invention are known to those in the art and may be obtained, for example, by polymerizing epoxides, such as ethylene oxide, propylene oxide, butylene oxide, tetrahydrofuran, styrene oxide or epichlorohydrin alone or in the presence of a Lewis catalyst. The polyethers may also be made by the addition of epoxides (preferably ethylene oxide and/or propylene oxide) optionally in admixture or successively, with starter components containing reactive hydrogen atoms. Examples of appropriate starter components are water, polyhydric alcohols, ammonia and polyfunctional amines. Specific examples of such materials are ethylene glycol, 1,3- or 1,2-propylene glycol, trimethylol propane, glycerol, sorbitol, 4,4'-dihydroxydiphenyl propane, aniline, ethanolamine and ethylene diamine. Sucrose polyethers and formitol or formose-started polyethers may also be used as the high molecular weight polyhydroxyl compounds of the present invention. It is preferred to use polyethers containing predominantly secondary terminal hydroxyl groups.

It is also possible to use polythioethers particularly condensation products of thiodiglycol itself and/or with other glycols, dicarboxylic acids, formaldehyde, aminocarboxylic acids or amino alcohols.

Polyesters containing hydroxyl groups which may be used in the present invention include reaction products of polyhydric (preferably dihydric and, optionally, trihydric and higher) alcohols with polybasic, (preferably dibasic) polycarboxylic acids or their anhydrides or the polycarboxylic acid esters of lower alcohols. The polycarboxylic acids upon which these polyesters are based may be aliphatic, cycloaliphatic, aromatic, araliphatic and/or heterocyclic in nature and may be substituted (for example by halogen atoms) or unsaturated. Specific examples of such carboxylic acids and their derivatives are adipic acid, sebacic acid, azelaic acid, didodecanoic acid, phthalic acid, isophthalic acid, tetrahydrophthalic acid anhydride, tetrachlorophthalic acid anhydride, endomethylene tetrahydrophthalic acid anhydride, glutaric acid anhydride, maleic acid anhydride, fumaric acid, dimerized and trimerized unsaturated fatty acids, terephthalic acid dimethyl ester and terephthalic acid-bis-glycol ester.

Suitable polyhydric alcohols which may be used to make polyethers which are appropriate for the present invention include: ethylene glycol, 1,2- and 1,3-propylene glycol, 1,4-butylene glycol, 2,3-butylene glycol, 1,6-hexane diol, 1,10-decane diol, neopentyl glycol, 1,4-bis-hydroxymethyl cyclohexane, 2-methyl-1,3-propane diol, glycerol, trimethylol propane, 1,2,6-hexane triol, pentaerythritol, quinitol, mannitol, sorbitol, formitol or formose, methyl glycoside, also di-, tri-, tetraethylene glycols, -propylene glycols and -butylene glycols. The polyesters may also contain terminal carboxyl groups.

Polyesters of lactones, for example ε-caprolactone, or of hydroxy carboxylic acids, for example ω-hydroxy caproic acid, may also be used in the practice of the present invention. Such polyesters are particularly advantageous when they contain additional components (such as diethylene glycol or 1,4-butane diol) which reduce their high crystallinity.

Suitable polyacetals for the practice of the present invention include those obtainable from glycols and formaldehyde.

Polycarbonates containing hydroxyl groups suitable for use in accordance with the invention are known to those skilled in the art. Such polycarbonates may be obtained, for example, by reacting 1,3-propane diol, 1,4-butane diol and/or 1,6-hexane diol, di-, tri- or tetraethylene glycol or thiodiglycol, with diaryl carbonates, (for example diphenyl carbonates) or phosgene.

Polybutadienes containing terminal hydroxyl groups are also suitable for use in accordance with the present invention because they give particularly elastic products that are stable to hydrolysis. The high molecular weight polyhydroxyl starting material of the present invention may also be a polyhydroxyl compound containing high molecular weight polyadducts or polycondensates or polymers in finely dispersed or even dissolved form. Polyhydroxyl compounds of this type may be obtained for example by carrying out polyaddition reactions (for example reactions between polyisocyanates and aminofunctional compounds) or polycondensation reactions (for example between formaldehyde and phenols and/or amines) in situ in the above-mentioned compounds containing hydroxyl groups. Processes of this type are described for example in German Publication Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862 and 2,633,293. However, it is also possible according to U.S. Pat. Nos. 3,869,413 and 2,255,860 to mix a prepared aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695 and German Publication No. 152,536) or polycarbonate polyols (German Patentschrift Nos. 1,769,795, U.S. Pat. No. 3,637,909) are also suitable for use in the process of the present invention. Where polyether polyols of the type modified by graft polymerization with vinyl phosphonic acid esters and, optionally, (meth)acrylonitrile, (meth)acrylamide or OH-functional (meth)acrylic acid esters (in accordance with German Offenlegungsschriften Nos. 2,442,101; 2,644,922 and 2,646,141) are used, plastics characterized by particularly high flame resistance are obtained. Polyhydroxyl compounds into which carboxylic groups have been introduced by radical polymerization with unsaturated carboxylic acids and, optionally, other olefinically unsaturated monomeric carboxyl groups, may be filled with mineral fillers. Additional examples of high molecular weight polyhydroxyl compounds suitable for use in the present invention are described in detail, for example in High Polymers, Vol. XVI, "Polyurethane, Chemistry and Technology" by Saunders-Frisch, Interscience Publishers, New York/London, Vol. I, 1962, pages 32 to 42 and pages 44 to 54, and Vol. II, 1964, pages 5 to 6 and 198 to 199, and in Kunststoff-Handbuch, Vol. VII, Vieweg-Hochtlen, Carl-Hanser-Verlag, Munich, 1966, for example on pages 45 to 71, and in German Offenlegungsschrift No. 2,854,384. It is of course possible to use mixtures of the above-mentioned polyhydroxyl compounds.

Dimeric or low-oligomeric 4,4'-diphenyl methane uret dione diisocyanates corresponding to the formula

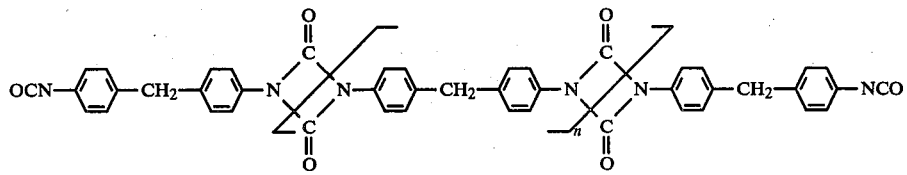

in which n=0 to 2.5, preferably 0 to 1.5 and, more preferably, 0.1 to 1.5 are also used as a starting material in the present invention. Such diisocyanates are formed by dimeric and low-oligomeric uret dione diisocyanates. In contrast, the products normally accumulating in the production of "dimers" from 4,4'-diphenyl methane diisocyanate are high melting and have high proportions of highly oligomerized uret diones (n 2.5). These relatively high molecular weight uret diones in which n 2.5 are unsuitable for the present invention. At best, polyuret diones of this type (i.e. n 2.5) may perform substantially the same function as fillers (See Comparison Examples infra).

The uret dione diisocyanates of diphenyl methane suitable for use in the present invention may be produced by carrying out the dimerization reaction at low temperatures in a weakly polar solvent (for example toluene, ethyl acetate or acetone). The products of this dimerization should also be worked up and dried at low temperatures (below about 50° C.). The low-oligomeric uret dione diisocyanates corresponding to the above formula in which n=0.1 to 1.5 are particularly preferred, because they form a stiffened hard segment which provides the polyurethane with improved properties. The oligomeric uret dione diisocyanates of diphenyl methane-4,4'-diisocyanate may even be directly produced in plasticizers, such as phthalates or phosphates (for example dioctyl phthalate, diisodecyl phthalate, dibenzyl phthalate, butyl benzyl phthalate, or trioctyl phosphate, or tricresyl phosphate) if production is carried out at a temperature not exceeding 50° C. and preferably at room temperature. The suspension of the uret dione diisocyanates in such a plasticizer normally contains from 10 to 60 wt. % (preferably from 20 to 40 wt. %) of the low oligomeric dimer in the plasticizer. Suspensions of this type may be used directly or in a mixture with a non-suspended diisocyanate in the production of polyurethanes. In either case, the plasticizer content of the polyurethane normally amounts to between 0.5 and 50 wt. % (preferably between 1 and 25 wt. %) (based on the polyurethane mixture). By precipitating the uret dione diisocyanates with a material such as petroleum ether from such a suspension, the corresponding powders may be analyzed and checked for adherence to the limits for n required for the present invention.

Since the dimerization reaction of 4,4'-diphenyl methane diisocyanate initiated by a suitable dimerization catalyst takes place much more quickly than the reaction of the monomeric diisocyanate with the high molecular weight polyhydroxyl compound (particularly polypropylene ethers containing secondary hydroxyl groups), it is also possible to produce the uret dione diisocyanate in situ in the presence of the high molecular weight polyhdyroxyl compound and to directly build up the systems of the invention from this finely divided suspension.

The systems of the present invention are preferably produced from modified 4,4'-diphenyl methane uret dione diisocyanates. Such modified diisocyanates may be made by modifying the diisocyanate of the general formula with difunctional or polyfunctional, low molecular weight compounds containing hydroxyl groups attached to aliphatic and/or cycloaliphatic groups and/or $NH_2$ groups attached to aromatic rings (including heterocyclic rings of aromatic character) and having molecular weights of from 62 to 400. It is preferred to use low molecular weight diols containing hydroxyl groups attached to aliphatic and/or cycloaliphatic groups and aromatic diamines having molecular weights from 62 to 400.

The low molecular weight modifying components are compounds which may be used as chain extending agents or crosslinking agents. These compounds generally contain from 2 to 8, preferably from 2 to 4 and, most preferably, 2 isocyanate-reactive hydrogen atoms (such as hydroxyl and/or amino groups). It is of course also possible to use mixtures of different hydroxy and or amino modifying compounds. Examples of such compounds are ethylene glycol, trimethylene glycol, 1,4-butane diol, 1,6-hexane diol, neopentyl glycol, 1,4-bis-hydroxymethyl cyclohexane and 1,4-dihydroxy cyclohexane. Less preferred compounds are diols containing secondary hydroxyl groups, for example propylene glycol, 2,3-butane diol or 2,5-pentane diol. Polyfunctional compounds which may be used are trimethylol propane, trimethylol ethane, 1,2,6-hexane triol, glycerol, pentaerythritol, quinitol, mannitol, sorbitol, castor oil and also di-, tri- and tetra-ethylene-, propylene- and -butylene-glycols, dihydroxy ethyl hydroquinone, formose and formitol. Other suitable polyfunctional compounds are diols or polyols containing tertiary amines, for example n-methyl diethanolamine, triethanolamine, and N,N'-bis-hydroxy ethyl piperazine. However, instead of using low molecular weight polyols, it is preferred to use low molecular weight aromatic diamines as the modifying compounds. Aromatic polyamines include amines which contain the amino group attached to heterocyclic radicals of aromatic character. Examples of suitable aromatic polyamines are tolylene diamines; diphenyl methane-4,4'- and/or -2,4'- and/or -2,2'-diamines; 3,3'-dichloro-4,4'-diamino diphenyl methane; 3-($C_1$–$C_8$)-alkyl-4,4'-diamino diphenyl methanes; 3,3'-di-($C_1$–$C_4$)-4,4'-diamino diphenyl methanes; 3,3',5,5'-tetra-($C_1$–$C_4$)-alkyl-4,4'-diphenyl methanes; 4,4'-diamino-diphenyl sulfides; sulfoxides or sulfones; diamines containing ether groups (German Offenlegungsschriften Nos. 1,770,525 and 1,809,172 (U.S. Pat. Nos. 3,654,364 and 3,736,295)); 2-halogen-1-3-phenylene diamines optionally substituted in the 5-position (German Offenlegungsschriften Nos. 2,001,772; 2,025,896 and 2,065,869); bis-anthranilic acid esters (German Offenlegungsschriften No. 2,040,644 and 2,160,590); 2,4-diaminobenzoic acid esters (German Offenlegungsschrift No. 2,025,900); and tolylene diamines substituted by 1 or 2 ($C_1$–$C_4$)-alkyl groups. 3,5-diethyl-2,4- and/or -2,6-diaminotoluene, asymmetric tetra-alkyl substituted diamino diphenyl methanes (for example 3,5-diethyl-3',5'-diisopropyl-4,4'-diamino diphenyl methane), 4,4'-diaminobenzanilide, and also 3,5-diaminobenzoic acid -($C_1$–$C_4$)-alkyl esters and 2,4'-diamino diphenyl methane are particularly preferred.

The aromatic diamines are preferred to the glycols. However, it is also possible to use diols or diamines containing additional groups, for example, adipic acid-bis-(2-hydroxyethyl)-ester, terephthalic acid-bis-(2-hydroxy-ethyl)-ester, diol urethanes, diol ureas or polyols containing sulfonate and/or phosphonate groups. Examples of such compounds are 1,6-hexamethylene-bis-(2-hydroxyethylurethane), 4,4'-diphenyl methane-bis-(2-hydroxyethylurea), the adduct of sodium bisulfite with 1,4-butene diol or its alkoxylation products. Other appropriate low molecular weight compounds are described in detail in German Offenlegungsschrift No. 2,854,384.

Compounds which are monofunctional with respect to isocyanates may optionally be used in quantities of from 0.01 to 10 wt. % as chain terminators in accordance with techniques known to those in the art. Such monofunctional compounds include monoamines (such as butylamine or dibutylamine, stearylamine, pyrrolidine, aniline or tolylne), butanol 2-ethylhexane, cyclohexanol and ethylene glycol monoethyl ether.

The modified diphenyl methane uret dione disocyanates may be produced by reacting m-equivalents of the difunctional or polyfunctional low molecular weight compound with m (1 to 1.5)+(0.8 to 1.5)-NCO-equivalents of the unmodified uret dione diisocyanate corresponding to the general formula. A synopsis of the appropriate amounts of equivalents to be used is given in the following Table:

TABLE

| m | Low modifying molecular weight compound (in eq.) | MDI-uret dione diisocyanate NCO/OH = | | |
|---|---|---|---|---|
| | | low value | (1:1) (in eq.) | maximum value |
| 0 | 0 | 0.8 | 1 | 1.5 |
| 1 | 1 | 1.8 | 2 | 3.0 |
| 2 | 2 | 2.8 | 3 | 4.5 |
| 3 | 3 | 3.8 | 4 | 6.0 |
| 4 | 4 | 4.8 | 5 | 7.5 |

TABLE-continued

| | Low modifying molecular weight compound (in eq.) | MDI-uret dione diisocyanate NCO/OH = | | |
|---|---|---|---|---|
| m | | low value | (1:1) (in eq.) | maximum value |
| 5 | 5 | 5.8 | 6 | 9.0 |
| 6 | 6 | 6.8 | 7 | 10.5 |
| 7 | 7 | 7.8 | 8 | 12.0 | m equivalents of modifying low molecular weight compounds are used with m (1 to 1.5)+(0.8 to 1.5) NCC-equivalents of unmodified diisocyanate. If, for example, m=4 and if a low molecular weight bifunctional compound is used as the modifying compound, 4 moles of the diol or the diamine are reacted with 4.8 or with 5 to 7.5 moles of the MDI uret dione diisocyanate (which is mixed for example with 1 mole of a bifunctional relatively high molecular weight polyhydroxy compound).

It is preferred to react m-equivalents of modifying low molecular weight compounds with m (1 to 1.5)+(1 to 1.5) NCO-equivalents of unmodified diisocyanate and particularly preferred to react m- equivalents of with m (1 to 1.2)–(1 to 1.2) NCO-equivalent of unmodified diisocyanate.

It is preferred to carry out the modification reaction between the low molecular weight compounds and the unmodified diisocyanate in situ in the relatively high molecular weight polyhydroxyl compound. When carried out in this manner, the low molecular weight modifying compound is added to a mixture of the unmodified diisocyanate in the high molecular weight polyhydroxyl compound or the unmodified diisocyanate is added to a mixture of the high molecular weight polyhydroxyl compound and the low molecular weight modifying compound mixture. The modified, relatively high molecular weight diphenyl methane uret dione diisocyanate is initially formed in the suspension in the high molecular weight polyhydroxyl compound with a definite increase in viscosity.

However, it is also possible to prepare the modified uret dione diisocyanate from the unmodified diisocyanate and the modifying compound separately from the high molecular weight polyhydroxyl compound. This is generally done in inert solvents or, optionally, in plasticizers containing carboxylic esters or phosphate esters. The modified uret dione diisocyanate thus produced may be filtered off, optionally size-reduced to the necessary fineness and then added to the relatively high molecular weight polyhydroxyl compound. On the other hand, a dispersion of modified diisocyanate formed in a plasticizer may also be added to the high molecular weight polyhydroxyl compound.

The unmodified diphenyl methane uret dione diisocyanate used is one in which n=0 to 2.5, preferably 0 to 1.5 and most preferably, 0.1 to 1.5.

The quantity of low molecular weight modifying compound appropriate to the present invention is any quantity such that the m-value is up to 7, i.e, has a value above 0 to 7.0. However, in the case of a polyhydroxyl compound at the lower end of the appropriate molecular weight range (molecular weight about 1000 to 1500), it is preferred that the modifying compound be used in a quantity such that m has a value of up to 3. In the case of medium molecular weights (for example from 1500 to 3000), m should preferably have a value of up to 5. Values of m up to 7 should preferably be used for polyhydroxyl compounds having molecular weights at the highest end of the appropriate molecular weight range.

Organic lead and/or tin compounds are particularly useful catalysts for the storage stable systems of the present invention, optionally in conjunction with other standard polyurethane catalysts, particularly catalysts containing tertiary amines.

Among the lead compounds which may be used, compounds from the following groups are preferred: organic salts of divalent lead with carboxylic acids; dithiocarbamates of divalent lead corresponding to the following formula

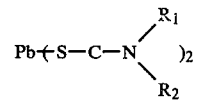

in which $R_1$ and $R_2$ may be different and represent a $C_1$–$C_{20}$-alkyl radical; tetra-organo-lead-(IV) compounds, the organic radical being a lower alkyl radical, such as methyl or ethyl; and compounds of 1,3-dicarbonyl compounds, such as acetyl acetone, with divalent lead. It is particularly preferred to use the salts of divalent lead with carboxylic acids, such as acetic acid, propionic acid, ethyl hexanoic acid, octanoic acid, lauric acid, ricinoleic acid, stearic acid, adipic acid, trimethyl adipic acid, naphthenic acid. Lead (II) octoate and lead (II) naphthanate are most preferred.

Suitable organo tin compounds are tin(II) salts of carboxylic acids, such as tin acetate, tin octoate, tin ethyl hexanoate and tin laurate, and tin(IV)compounds, for example dibutyl tin oxide, dibutyl tin dichloride, dibutyl tin dilaurate, dibutyl tin maleate or dibutyl tin diacetate.

In the case of the tin catalysts, however, it is preferred to use sulfur-containing tin compounds corresponding to the following formula

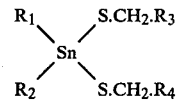

in which $R_1$ and $R_2$ represent alkyl radicals containing from 1 to 10 carbon atoms; $R_3$ and $R_4$ represent hydrogen and/or $C_1$–$C_{18}$-alkyl group and/or the radical $COOR_1$.

Di-(n-octyl)-tin(IV)-bis-thiomethyl or dimethyl-tin-bis-thiolauryl are specific examples of such compounds. It is particularly preferred to use tin compounds in which $R_3$ and $R_4$ represent the above-mentioned ester radicals, for example dimethyl-tin-bis-thioglycolic acid hexyl ester or dibutyl-tin-bis-thioglycol octyl ester. The above-mentioned catalysts may of course also be used in the form of mixtures, particularly when the low molecular weight chain extending agents and the relatively high molecular weight polyols simultaneously contain primary and secondary OH groups or when the H-acid compounds have different reactivities. Combinations of the organo metallic compounds with amidines, aminopyridines, hydrazino-pyridines (German Offenlegungsschriften No. 2,434,185; 2,601,082 and 2,603,834), or 1,4-diazabicyclo-2,2,2-octane and/or standard tertiary amine catalysts, of the type normally used in polyurethane chemistry, are also useful.

As will be explained in more detail hereinafter, the above-mentioned lead and/or tin compounds are of particular significance to the reactive composition. They show particularly selective catalytic effects in the system of the present invention which effects are not shown to the same extent by other known catalysts. The polyurethane plastics formed from systems with these special catalysts are also superior to those made from such systems in which a different catalyst is employed.

The lead catalysts are particularly active and effective when polyether polyols containing secondary hydroxyl groups, (for example polypropylene oxide glycols) are used in the system. The tin compounds, especially the tin/sulfur catalysts, are particularly active in cases where polyester polyols containing primary hydroxyl groups are used. The catalysts are generally used in a quantity of from 0.001 to 5 wt. % and preferably in a quantity of from 0.01 to 2 wt. % (based on the sum of high molecular weight polyhydroxyl compound plus diisocyanate).

Filler-like, finely divided polyadducts, preferably having an average particle size of 1 to 70 μm, may optionally be added to the mixture or to the starting components, (preferably to the high molecular weight polyol component). Such polyadducts may generally be used in quantities of from 0 to 25 wt. %, preferably from 0 to 12.5 wt. % and most preferably from 2.5 to 12.5 wt. % (based on the mixture as a whole). Such polyadducts may be produced from polyisocyanates and at least one relatively low molecular weight compound containing two or more NCO-reactive groups and having a molecular weight in the range from 32 to 400 (preferably in the range from 62 to 400). The polyisocyanates used in making such polyadducts are the polyisocyanates typically used in the synthesis of polyurethanes, preferably diisocyanates of the type described in detail, for example, on pages 8 to 11 of German Offenlegungsschrift No. 2,854,834. Examples of appropriate diisocyanates are 1,6-hexamethylene diisocyanate, 2,4- and/or 2,6-hexahydrotolylene diisocyanate, perhydro-2,4'- and/or -4,4'-diphenyl methane diisocyanate, 1-isocyanato-3,3,5-trimethyl-5-isocyanatomethyl cyclohexane, 2,4-and/ or 2,6-tolylene diisocyanate, diphenyl methane-2,4'- and/or -4,4'-diisocyanate, including its alkyl- and chlorine-substituted derivatives, and naphthylene-1,5-diisocyanate.

Suitable relatively low molecular weight compounds include those described above as modifying compounds and, in addition, compounds containing aliphatically bound amine, hydrazine, hydrazide (including semicarbazide) and carbazinic acid ester groups. Compounds of this type include hydrazine, ethylene diamine, hexamethylene diamine, 1,4-diamino-cyclohexane, 4,4'-diaminodicyclohexyl methane, isophorone diamine, m- and/or p-xylylene diamine, 1,6,11-triamino-undecane and lysine methyl ester. In addition to hydrazine, N,N'-dimethyl hydrazine and dihydrazide compounds, such as polycarboxylic acid hydrazides (e.g. carbodihydrazide, oxalic acid dihydrazide, adipic acid dihydrazide, terephthalic acid dihydrazide, tartaric acid dihydrazide), the group of bis-semicarbazides (for example hexamethylene-bis-semicarbazide) and the group of bis-carbazinic esters, (for example ethylene glycol-bis-carbazide) are also suitable. Compounds containing hydrazide and/or semicarbazide and/or carbazinic ester groups (for example β-semicarbazidopropionic acid hydrazide), and also amino-hydrazide compounds (such as β-aminopropionic acid hydrazide) may also be used.

These isocyanates and isocyanate-reactive compounds may be reacted in substantially equivalent quantities in solvents, plasticizers or even in the high molecular weight polyhydroxyl component of the system of the present invention and are added to the reaction mixture in the form of a finely divided suspension.

Auxiliary agents and additives which may optionally be used in accordance with the present invention include dyes, pigments, fillers (such as silica gel, gypsum, talcum, active carbon),UV-absorbers or stabilizers (such as phenolic oxidation inhibitors), light stabilizers, blowing agents, surface-active additives (such as emulsifiers or foam stabilizers), cell regulators, antiblocking agents, silicones, flame-proofing agents, and fungistatic and/or bacteriostatic substances.

Suitable fillers are, for example, fibrous materials, i.e. any inorganic and/or organic fibrous reinforcing material known to those in the art. Specific examples of such fillers are glass fibers (preferably in lengths of from 20 to 60 mm) graphite fibers, asbestos fibers and fiber materials emanating from an organic polymer, for example from a polyester (such as polyethylene terephthalate) or preferably aromatic polyamides (such as m-phenylene/isophthalic acid polyamide or poly-p-phenylene terephthalamide or even polycaprolactam). These fibrous materials may also be used in the form of mats, tows, continuous fibers, fleeces, cloths or random staple fiber mixtures. It is preferred to use glass fibers treated with a sizing compound to enhance the affinity of the fibers for polyurethanes. The quantity of filler to be incorporated depends upon the improvement required in the mechanical properties and in general amounts to between 5 and 60 wt. % (expressed as fiber).

To produce the storage stable heterogeneous systems of the present invention, the diphenyl methane uret dione diisocyanate (n=0 to 2.5) may be suspended in the form of a fine powder (preferably having a particle size of from 1 to 70μ) in the corresponding relatively high molecular weight polyol (for example polyether or polyester). In the case of the unmodified uret dione diisocyanate, the NCO/OH ratio generally amounts to between 0.8 and 1.5, preferably between 1.0 and 1.5 and, most preferably, between 1.0 and 1.2. The uret dione diisocyanate is regarded as a diisocyanate so that only the free NCO-groups and not the uret dione group with its latent NCO-group are taken into account.

Modified uret dione diisocyanates are used in a molar ratio of m (1 to 1.5)+(0.8 to 1.5) NCO-groups for each reactive group of the relatively high molecular weight polyhydroxyl compound.

In the case of viscous or solid, relatively high melting (approximately 45 to 65° C.) polyols, the suspension may be prepared by briefly heating to 50°–70° C., in order to assure uniform distribution of the non-melting uret dione diisocyanate in the polyol. The polyol/uret dione diisocyanate combinations thus obtained are pourable, knife-spreadable, paste-like or solid, depending upon the viscosity and melting behavior of the starting polyols. These reactive mixtures represent a heterogeneous dispersion of the uret dione diisocyanate in the polyol. The required crosslinking of these mixtures by heating may be carried out after the addition of suitable catalysts. In the absence of such catalysts, the reaction follows a different course insofar as there is no reaction between NCO-groups and OH-groups to form the polyurethane, but instead a relatively fast NCO-dimerization reaction involving the uret dione diisocyanate. This fast dimerization yields little, if any, high molecular weight polyurethane plastic having favorable properties.

It is possible for the uret dione diisocyanate component to be initially produced in situ from diphenyl methane-4,4'-diisocyanate in the presence of the corresponding relatively high molecular weight polyols. This is accomplished by slowly adding the predetermined quantity of diphenyl methane diisocyanate dropwise at as low a temperature as possible (0 to 25° C.) to a solution of the dimerization catalyst (such as for example 0.2 to 3% of tributyl phosphine, based on the polyol) in the polyol. After stirring for an appropriate time (e.g. 4 to 6 hours), the dimerization catalyst is neutralized by the addition of compounds, such as sulfur powder, tosyl ester or by passing air through. The products thus obtained are suspensions of the low-oligomeric uret dione diisocyanates in the polyol which, by virtue of their smaller particle size, have a higher initial viscosity than suspensions obtained simply by mixing ground powders of oligomeric uret dione diisocyanates in polyols.

The mechanical properties of polyurethane elastomers prepared from the systems of the present invention may be varied within wide limits by using low molecular weight chain extending agents in the reactive mixture to modify the uret dione diisocyanates. Diols and also aromatic diamines are preferably used as chain extending agents. To produce systems having a large number of hard segments, the diol or diamine modifying compound should be added to the suspension of the uret dione diisocyanate in the relatively high molecular weight polyol (which may already contain catalyst). The uret dione diisocyanate should be used in a quantity large enough to react with the diol or diamine modifying compound to form the modified isocyanate. For this reaction, only free NCO-groups in the uret dione diisocyanate should be taken into account for calculation purposes.

A slow preliminary reaction takes place between the low molecular weight modifying diol or diamine and the MDI-uret dione diisocyanate present in heterogeneous dispersion in the high molecular weight polyhydroxyl compound. The preliminary reaction, which depends upon the reactivity of the modifying compound is completed after a few hours at room temperature and only then are the actual storage stable heterogeneous heat-hardening systems of the present invention obtained. This preliminary reaction of diisocyanate with the low molecular weight chain extending agents to form the modified uret dione diisocyanate is accompanied by a definite increase in viscosity so that, depending upon the quantity of the chain extender, it is possible to produce pourable or at least knife-spreadable, paste-like or even solid (at room temperature), but readily fusible (below 70° C.) systems.

It is also possible, instead of producing the uret dione diisocyanates modified by hard segments in situ in dispersion in the high molecular weight polyhydroxyl compound, to produce the modified uret dione diisocyanates in a separate reaction step. This may be accomplished by reacting the entire quantity of MDI-uret dione diisocyanate with the low molecular weight compound in an inert solvent (such as toluene), filtering off the NCO-containing modified uret dione diisocyanate under suction and optionally powdering the modified diisocyanate. This diisocyanate is then mixed with the catalyst-containing polyol. However, this process is more involved and less preferred than that described previously.

An important feature of the systems of the present invention is that aromatic diamines, such as 4,4'-diamino diphenyl methane, 2,4- or 2,6-diamino toluene or 1,5-diaminonaphthalene or 3,5-diethyl-3',5'-diisopropyl-4,4'-diamino diphenyl methane, may also be used in them without changing the character of the system. If, however, these diamines are reacted with NCO-prepolymers by one of the processes normally used in polyurethane chemistry, extremely short pouring times are obtained with the result that the mixtures in question do not level satisfactorily in molds.

All of these systems may be hardened by heat shock, after a suitable catalyst has been added. Surprisingly, no crosslinking reaction takes place at room temperature, even in the presence of the catalyst, so that these mixtures may be referred to as storage stable systems. In the absence of catalyst, no hardening occurs even at temperatures above 140° to 160° C. and the NCO-reactions with the OH-group are much slower than the dimerization reaction of the NCO-groups.

It has been found that particularly favorable systems are those in which a lead and/or tin catalyst is employed. Thus, in the production of systems having good heat hardening properties, lead catalysts (particularly lead octoate and lead naphthanate) are the most effective catalysts in cases where relatively high molecular weight polyols containing secondary hydroxyl groups (particularly polypropylene oxide polyols) are used as the relatively high molecular weight polyhydroxyl component. The tin-containing catalysts, especially the sulfur-containing tin catalysts, are preferably used for processing systems containing primary hydroxyl groups.

Other compounds which are frequently described as effective catalysts in polyurethane chemistry are ineffective or inadequate in the systems of the present invention so that the mechanical properties of the plastics are adversely affected. Standard polyurethane catalysts may, however, be used, in addition to the lead and/or tin catalyst required.

One feature common to the heat-hardening systems of the present invention is that, even in the presence of the effective lead and/or tin catalysts mentioned above, they show surprising stability in storage at room temperature, i.e. there was no increase in viscosity even over an observation period of 3 to 5 months and, in some cases, up to 8 months.

The processing of the systems of the present invention depends upon their character. Liquid systems pourable at room temperature may be processed by casting. If necessary, they may be briefly heated before processing, for example to a temperature in the range from 50° to 70° C.

Systems that cannot be poured, but which still level may be applied to substrates by means of a coating knife and subsequently hardened by heat shock.

At room temperature, plastic systems (pastes) may be compression-molded with heating. A period of from 5 to 15 minutes at 120° C. is sufficient for hardening.

Solid systems, particularly those based on relatively high melting starting polyols (45° to 65° C.) may either be formed under pressure (injection molding) or processed at or above the melting temperature of the polyol. Systems prepared beforehand may be introduced in the form of solid granulates into a mold heated to a temperature above the melting point of the polyol (generally below 70° C.). After melting the granulates, the mold is filled and the contents of the mold hardened by heating the mold to 100° to 120° C.

The systems of the present invention harden at temperatures as low as 80° to 140° C. and preferably at temperatures in the range from 110° to 130° C. In the case of injection molding, the heating time may amount to between 4 and 30 minutes and, in the case of casting, to between 30 minutes and several hours. In some cases, it is advantageous to temper the plastics for a while at 100° C. after removal from the mold in order to guarantee thorough hardening.

Another feature of the systems of the present invention is that they are reactive mixtures in which the high melting and highly insoluble MDI-uret dione diisocyanate is always present in heterogeneous phase.

Opaque or milky (i.e. non-transparent) moldings are always obtained from the systems of the present invention after heating.

Selection of the high molecular weight polyhdyroxyl compound and the low molecular weight modifying compound for the present invention and, in particular, the quantity in which the low-molecular weight modifying compound is used affects the mechanical properties of the polyurethanes ultimately obtained. Thus, the hardness and breaking elongation or tensile strength, may be optimally adapted to a particular application.

The plastics obtainable in accordance with the present invention may be used in various applications, for example, as solid moldings or as integral-foam moldings; as foamed or solid sheet-form structures such as, for example, coatings on substrates; as adhesives; as foam plastics; and also as hardenable sealing compounds or elastic cable sealing compounds.

Having thus described our invention, the following Examples are given by way of illustration. All parts and percentages given in these Examples are parts by weight and percentages by weight, unless otherwise indicated.

EXAMPLES

Example 1

(Comparison)

This example illustrates production of "dimeric" diphenyl methane diisocyanate by one of the known methods.

1.5 g of tributyl phosphine were added at room temperature to a solution of 1000 g (4.0 moles) of diphenyl methane-4,4'-diisocyanate (MDI) in 2000 g of toluene. After a short period of time, the dimeric MDI precipitated from the solution and the temperature gradually rose to 30°-35° C. The reaction mixture was stirred for an additional 4 hours before the dimerization catalyst was deactivated by the addition of 1.5 g of toluene sulfonic acid methyl ester. The solid MDI-"dimer" was then filtered off under suction. After drying for about 5 hours at 70° to 80° C., approximately 800 g of MDI-"dimer" were obtained in the form of a fine powder. This powder was insoluble in almost every solvent. Its decomposition point was above 250° C.

The usual method for determining free NCO-groups in acetone or dimethyl formamide by titrating with dibutyl amine gives very inaccurate results in the case of high molecular weight MDI-dimer (insoluble residues, splitting of the uret dione ring). The free NCO-content was therefore determined by reacting the MDI-dimer with dibenzylamine to form a sterically hindered amine. The amount of amine consumed by this reaction was determined gravimetrically.

Free NCO-content was determined by heating a suspension of 10 g of MDI-dimer in 150 ml of toluene and 15 g of dibenzylamine (excess) for 30 minutes to 50° C. The solid product was isolated and the increase in weight determined. Surprisingly, the NCO-groups of the dimeric and oligomeric MDI-uret dione diisocyanate could also be determined sufficiently accurately with the sterically hindered diamine 2,4-diamino-$==$3,5-diethyltoluene. $NH_2$-terminated polyureas in which the uret dione ring was still intact were formed (Example 9) and the uptake of amine (reaction with free NCO-groups) was greatest in the case of the low molecular weight MDI-dimer. In the case of a defined addition product of 2 moles of sterically hindered amine with 1 mole of the MDI-"dimer", different amine uptakes were obtained for different degrees of uretdione formation of the MDI-"dimer" ($=n$).) The NCO-content and the value of n and hence the molecular weight may be calculated from the dibenzylamine uptake of MDI-dimer (See Table I).

TABLE I

| n | Molecular weight | Amine uptake g/10 g MDI-dimer | % NCO (calculated) |
|---|---|---|---|
| 0 | 500 | 7.88 | 16.8 |
| 1 | 750 | 5.26 | 11.2 |
| 2 | 1000 | 3.94 | 8.4 |
| 3 | 1250 | 3.15 | 6.7 |
| 4 | 1500 | 2.62 | 5.6 |

The "MDI-dimer" produced by the method described above showed an amine uptake of 3.0 g per 10 g of MDI-dimer, corresponding to a calculated NCO-value of 6.4%. A so-called MDI-"dimer" of this type is not suitable for the polyurethane reactions according to the invention. A test specimen produced in accordance with the procedure described in Example 13 remained correspondingly uncrosslinked and liquid, i.e, it could not be hardened by heat to form high-grade polyurethanes.

Example 2

This example illustrates production of dimers or low-oligomeric diphenyl methane uret dione diisocyanates ($n \leq 2.5$) suitable for use in the present invention.

Dimerization carried out in the same way as described in Example 1 with the exception that after filtration under suction the crude product was washed with petroleum ether and dried in vacuo solely at low temperatures of up to about 30° C., yielded a low molecular weight uret dione diisocyanate characterized by an amine uptake of 7.2 g (corresponding to a calculated NCO-value of 15.3%, i.e. to an n-value of 0.2). In contrast to the highly oligomerized MDI-derivative of Example 1, this diisocyanate (substantially dimeric) was quite suitable for the production of highly elastic polyurethanes. (See Example 13 infra).

Example 3

The effect of different solvents on the dimerization reaction to form relatively high molecular weight, so-called dimers of diphenyl methane diisocyanate was studied.

0.25 g of tributyl phosphine were added to a solution of 100 g of diphenyl methane-4,4'-diisocyanate in quantities of 100 g of each of the solvents listed in Table II. The dimer precipitated after only a short time in the form of a white deposit. After stirring for another 2 hours at room temperature, the dimerization catalyst was deactivated by the addition of 0.25 g of toluene sulfonic acid methyl ester. The MDI-dimer was filtered off under suction and, after washing with petroleum ether, was dried in vacuo at room temperature, i.e. without heating.

The yields (expressed in percent of the theoretical), the quantity of sterically hindered amine taken up per 10 g of dimer (See Example 1), and the NCO-content of the dimer and of the oligomers and n as calculated therefrom are shown in Table II.

TABLE II

| | Solvent | MDI-dimer yield (% of the theoretical) | Amine uptake (g/10 g of MDI-dimer) | Average molecular weight | % NCO (calculated) | n (calculated) |
|---|---|---|---|---|---|---|
| A | tetrahydro furan | 55 | 3.3 | 1175 | 7.1 | 2.7 |
| B | dioxane | 50 | 1.7 | — | 3.54 | 7.5 |
| C | chloroform | 90 | 3.0 | — | 6.4 | 3.3 |
| D | methylene chloride | 88 | 3.0 | — | 6.4 | 3.3 |
| E | 1,2-dichloroethane | 92 | 4.4 | 900 | 9.4 | 1.6 |
| F | ethylacetate | 62 | 7.49 | 525 | 16.0 | 0.10 |
| G | acetone | 75 | 7.44 | 530 | 15.85 | 0.12 |
| H | chlorobenzene | 75 | 7.44 | 530 | 15.85 | 0.12 |
| I | benzoic acid ethyl ester | 80 | 7.20 | 550 | 15.3 | 0.2 |
| J | phthalic acid dioctyl ester | 72 | 6.70 | 588 | 14.3 | 0.35 |

High molecular weight diphenyl methane uret diones (which according to Example 10, are unsuitable for further polyurethane reactions in the context of the invention) were always obtained under the above-described reaction conditions using highly polar solvents such as those of Experiments A through D. The products of Experiment E gave only relatively soft elastomers, but they could still be used. The products of Experiments F through J were low molecular weight oligomers (n below 2.5) and were suitable for further reactions in accordance with the present invention. However, if the MDI-uret diones of Experiments F through J were tempered for a while at 100° C.S, they underwent dimerization to form high molecular weight MDI-"dimer" which gave test results as poor as those of Experiments A through E when used in accordance with Example 13.

Example 4

The effect of tempering conditions on low molecular weight MDI-dimers was investigated.

The low molecular weight MDI-dimer obtained in Example 2 was tempered for different periods of time at 100° C. The following relatively high molecular weight products were obtained after the times indicated in Table III:

TABLE III

| | Time (mins.) | Amine uptake (g/10 g of MDI-dimer) | NCO calculated (%) | n calculated (%) | Average molecular weight |
|---|---|---|---|---|---|
| A | 0 | 7.2 | 15.3 | 0.2 | 550 |
| B | 15 | 6.42 | 13.4 | 0.51 | 627 |
| C | 30 | 6.75 | 12.1 | 0.77 | 692 |
| D | 45 | 5.2 | 11.1 | 1.03 | 757 |
| E | 60 | 3.65 | 7.8 | 2.3 | 1075 |
| F | 120 | 0.22 | ~0.5 | ~65 | 16 800 |

After testing in accordance with the procedure described in Example 13, the products of Experiments A through D gave elastic polyurethanes having Shore A hardness values in the range from 55 to 45. The relatively high molecular weight dimer of Experiment E was suitable only to a limited extent because it gave soft elastomers. The product of Experiment F was unsuitable for further polyurethane reactions.

Example 5

An MDI-dimer was produced in the presence of a polyether by the following procedure:

A concentrated solution of 1000 g of 4,4'-diisocyanato-diphenyl methane (MDI) in 400 g of acetone was added dropwise over a period of 30 minutes to a mixture of 15 g of tributyl phosphine and 2000 g of a linear polypropylene glycol ether (OH-number=56, MW=2000). The oligomeric MDI precipitated after only a short time in the form of a fine deposit; the temperature gradually rose to 35°–40° C. After stirring for another 5 hours in the absence of heat, the catalyst was deactivated by the addition of 15 g of powdered sulfur. The removal of acetone by distillation in a water jet vacuum at temperatures below 25° C. left a suspension of MDI-dimer in the polyether (viscosity=50,000 mPas) having a solids content of 33.3%.

After an observation period of 5 months, there was no increase in viscosity at room temperature. This mixture may therefore be regarded as storage stable.

A small sample of the MDI-dimer was diluted with acetone, the solids fraction of the uret dione diisocyanate was isolated and washed with petroleum ether. The NCO-content was determined gravimetrically after reaction with the sterically hindered dibenzyl amine. The value of n thus determined was 0.25.

Where the filtrate was carefully concentrated, the polyether showed only a slight increase in viscosity from the original value of 600 mPas to 850 mPas during the dimerization reaction. This means that the speed of dimerization of the diphenyl methane diisocyanate was considerably greater than the reaction velocity of the NCO-groups with the OH-groups in the polyether.

Example 6

(Comparison Example)

This example illustrates production of dimeric tolylene diisocyanate.

The procedure of Example 1 was repeated with the exception that the 1000 g of MDI in Example 1 was replaced by 696 g (4.0 moles) of TDI. 550 g of dimeric TDI were obtained. This white powder melted at 150 to 152° C. and, in polar solvents was distinctly more soluble than the dimeric MDI. NCO-titration with di-n-butylamine at room temperature indicated 24 to 25% NCO (no splitting of the uret dione ring). DMF-titration (15 minutes, $H_2O$-bath) showed 35.5% of NCO (splitting of the uret dione ring to form the biuret).

Example 7

Stability of the uret dione ring in MDI-dimers was studied in this experiment.

A suspension of 10 g of MDI-dimer of Example 2, 100 g of toluene and 15 g of 1,4-butane diol (large OH-excess) was stirred for 1 hour at 100° C. The reaction product was filtered off under suction and dried. IR-spectroscopy showed that the uret dione ring in the product remained intact and that only the free NCO-groups had reacted to form the urethane. Even in the presence of a catalyst (Pb-octoate (0.2 g)), the uret dione ring was not split by the diol under these conditions.

Example 8

(Comparison Example)

Example 7 was repeated with the exception that 10 g of the dimeric TDI of Example 6 was used. It was not possible to detect a uret dione ring in the end product. Only urethane groups and allophanate groups were detected.

In the presence of Pb-octoate, the content of allophanate groups increased indicating that complete splitting of the uret dione ring had taken place.

Example 9

The suspension of 10 g of MDI-dimer in 100 g of toluene of Example 7 was kept at 100° C. for 30 minutes in the presence of 15 g of the aromatic diamine 2,4-diamino-3,5-diethyl toluene. The uret dione ring was also unexpectedly stable in this case. The urea groups formed were detected by reaction of the amine with the free NCO-groups while the uret dione ring remained intact.

Example 10

(Comparison Example)

10 g of dimeric TDI were reacted with the diamine of Example 9. An end product in which the uret dione ring could no longer be detected (due to different reactivity of the uret dione ring) was obtained under the same reaction conditions as were used in Example 9.

Example 11

100 g of a linear polypropylene glycol ether having a molecular weight of 2000 (OH number 56) were thoroughly mixed with 25 g of the MDI-dimer of Example 2. The air stirred in during this mixing was then removed. This mixture, which was easy to stir at room temperature, was then heated for a few hours to 120°–140° C. No crosslinking took place and the suspension remained unchanged in its viscosity. However, there was a loss of NCO-groups accompanied by the formation of more uret dione groups.

When a catalyst was subsequently added to this preheated suspension, no crosslinking to form polyurethane was observed at a temperature of 120° C. At 50° C., however, a mixture of ether and "dimer" according to Example 2 was stable in storage without any significant further uret dione formation and could subsequently be crosslinked by heat shock in the presence of lead catalysts to form a polyurethane.

When (0.2% of lead octoate was added to the mixture of polyether and MDI-dimer produced in Example 2), the mixture remained stable in storage at room temperature. However, after heating for 1 hour to 120° C. a reaction resulting in formation of the high molecular weight elastomer (See Example 13) occurred.

Example 12

(Comparison Example)

Example 11 was repeated using 18 g of dimeric tolylene diisocyanate instead of 25 g of MDI-dimer. After the mixture was heated to 120°–140° C., rapid crosslinking occurred and a substantially transparent, although very soft polyurethane was obtained. Although this mixture reacted to form the same polyurethane when no catalyst was used, measurement of its stability in storage at 50° C. showed that, even at this low temperature, crosslinking and a continuous increase in viscosity occurred within a few days. Therefore, this mixture could not be regarded as stable in storage.

Example 13

0.2 g of Pb-octoate were added to the reaction mixture of MDI-dimer in polyether described in Example 11. After degassing in vacuo, the suspension was readily poured into a suitable mold coated with a release agent and heated for 30 minutes to 1 hour at 110° to 120° C. A highly elastic elastomer having the following mechanical properties was obtained:

| | | |
|---|---|---|
| Hardness (A) | 53 505 | 50–55 |
| Tensile strength (MPa) | 53 504 | 3–4 |
| Breaking elongation (%) | 53 504 | 100–105 |
| Tear propagation resistance (KN/m) | 53 515 | |
| Elasticity (%) | 53 512 | 55–60 |

This reaction mixture was stable in storage at room temperature. There was no increase in viscosity after an observation period of 8 months. The mixture did, however, harden to form a polyurethane elastomer when subjected to heat shock after the 8 months storage period.

Example 14

(Comparison Example)

Adding 0.1 g of Pb-octoate or tin (II) ethyl hexoate or diazabicyclooctane, to the combinations of polyether and the dimeric TDI of Example 12 increased the reactivity of the mixture significantly. Even at room temperature, crosslinking to form swollen products occurred after only a few hours or a few days, depending upon the specific catalyst and the quantity in which it was used.

Example 15

A mixture of 2000 g (1.0 mole) of the polypropylene glycol ether described in Example 11 (OH-number 56) and 125 g (0.5 mole) of 4,4'-diisocyanatodiphenyl methane was heated at 70° to 80° C. until no more NCO-groups could be detected. 500 g of this OH-prepolymer were then thoroughly mixed with 62.5 g of MDI-dimer and 0.5 g of Pb-octoate. The resulting mixture was poured into a suitable mold and then heated for 2 to 3 hours at 110° to 120° C. Elastomers having the following mechanical properties (determined by the test procedures identified in Example 13) were obtained.

| | |
|---|---|
| Hardness (A) | 52 |
| Tensile strength (MPa) | 3.5 |

-continued

| | |
|---|---|
| Breaking elongation (%) | 125 |
| Tear propagation resistance (KN/m) | 6.5 |
| Elasticity (%) | 54 |

Example 16

230 g of MDI-dimer in finely particulate form (10–20μ) were added to and intensively mixed with a solution of 15 g of ethylene glycol in 500 g of the polyether described in Example 11. After the addition of a combination of 0.5 g of Pb-octoate and 0.5 g of a tin catalyst based on dioctyl tin dithioalkyl ester (FOMREZ-UL 29, a Witco product), the sample was heated for 2 hours at 120° C. The elastomer formed had the following mechanical properties (determined by the test procedures identified in Example 13):

| | |
|---|---|
| Hardness (A) | 65 |
| Tensile strength (MPa) | 7 |
| Breaking elongation (%) | 220 |
| Tear propagation resistance (KN/m) | 8 |
| Elasticity (%) | 55 |

The reaction mixture which could be applied by knife coating was storable at room temperature.

Example 17

212.5 g of powdered MDI-dimer and 0.8 g of a tin catalyst (FOMREZ-UL 29, a Witco product) were added at 50° to 60° C. to a solution of 12.5 g of ethylene glycol in 500 g of polytetrahydrofuran (OH-number=56, MW=2000). After degassing, the mixture was poured into a suitable mold and heated for 2 hours at 120° C. The elastomer formed had the following properties (determined by the procedures identified in Example 13):

| | |
|---|---|
| Hardness (A) | 88 |
| Tensile strength (MPa) | 10.2 |
| Breaking elongation (%) | 310 |
| Tear propagation resistance (KN/m) | 20 |
| Elasticity (%) | 55 |

In the absence of heating, the reaction mixture was storable at room temperature in the form of a viscous paste.

Example 18

500 g of a linear polypropylene glycol ether (molecular weight 2000; OH-number 37) modified in accordance with U.S. Pat. No. 3,304,273 (German Patent No. 1,152,536) by the in situ polymerization of styrene and acrylonitrile were mixed with 100 g of MDI-dimer. After the addition of 1.25 g of lead naphthanate, the mixture (which was easy to pour at room temperature) was heated for 2 hours at 120° C. A highly elastic molding having the following mechanical properties (determined by the procedures identified in Example 13) was obtained:

| | |
|---|---|
| Hardness (A) | 74 |
| Tensile strength (MPa) | 6.0 |
| Breaking elongation (%) | 150 |
| Tear propagation resistance (KN/m) | 10 |
| Elasticity (%) | 52 |

This pourable mixture remained stable in storage but could be hardened by heat shock at any time to form the polyurethane.

Example 19

500 g of a linear polypropylene glycol (molecular weight 2000, OH-number 56) were thoroughly mixed with MDI-dimer and aromatic diamines in the quantities indicated in Table IV. 0.6 g of Pb-octoate were then added. There was a gradual increase in viscosity which reached its maximum after 1 to 2 days at room temperature (in situ reaction of MDI-uret dione with the aromatic diamine to form the modified MDI-uret dione diisocyanate). Pourable, knife-spreadable, paste-like or solid (depending upon the quantity of amine used) reaction mixtures were obtained. These reaction mixtures had a storage life at room temperature of at least 6 months. The mixtures could be hardened at any time by heat shock. The specific processing technique was governed by the consistencey of the system.

However, when the MDI-uret dione diisocyanate was replaced by a corresponding quantity of dimerized tolylene diisocyanate, the systems obtained had no storage life, even at room temperature. The systems swelled or crosslinked after only a few hours or days.

TABLE IV

| | Aromatic Diamines | Quantity of diamines (g) | Quantity of MDI-dimer (g) | Remarks |
|---|---|---|---|---|
| A | 2,4-/2,6-diamino-3,5-diethyl toluene (80/20 mixture) | 5 | 38 | pourable at room temperatrue |
| B | 2,4-/2,6-diamino-3,5-diethyl toluene (80/20 mixture) | 10 | 50 | highly thixotropic, had to be processed by forming |
| C | 2,4-/2,6-diamino-3,5-diethyl toluene (80/20 mixture) | 15 | 64 | highly thixotropic, had to be processed by forming |
| D | 2,4-/2,6-diamino-3,5-diethyl toluene (80/20 mixture) | 20 | 78 | highly thixotropic had to be processed by forming |
| E | 4,4'-diamino-3,5-diethyl-3',5'-di isopropyl diphenyl methane | 10 | 34 | pourable |
| F | 4,4'-diamino-3,5-diethyl-3',5'-di isopropyl diphenyl methane | 15 | 44 | knife-spreadable |
| G | 2,4-diaminotoluene | 2.0 | 34 | pourable |
| H | 4,4'-diaminodiphenyl-methane | 6.0 | 40 | knife-spreadable, pourable |
| I | 1,5-diaminonaphthalene | 4.0 | 30 | pourable |

The heating conditions and mechanical properties of the elastomers obtained are shown in Table V. These properties were determined by the test procedures identified in Example 13.

TABLE V

| System | Heating conditions (time/temp) | Hardness (Shore A/D) | Tensile strength (MPa) | Breaking elongation (%) | Tear propagation resistance (KN/m) | Elasticity (%) |
|---|---|---|---|---|---|---|
| A | 2h/120° C. | 70 | 8.0 | 300 | 13 | 52 |
| B | 20 mins/120° C. 100 bars | 85 | 10.5 | 330 | 18.5 | 46 |
| C | 20 mins/120° C. 100 bars | 95/40 D | 15.0 | 200 | 25 | 44 |
| D | 20 mins/120° C. 100 bars | 98/45 | 15.0 | 150 | 30 | 40 |
| E | 2h/120° C. | 67 | 8.0 | 300 | 13 | 45 |
| F | 3h/120° C. | 82 | 12.0 | 350 | 24 | 43 |
| G | 3h/120° C. | 57 | 5.5 | 285 | 9 | 47 |
| H | 3h/120° C. | 72 | 9.5 | 350 | 15 | 45 |
| I | 3h/120° C. | 60 | 6.5 | 250 | 14 | 42 |

Example 20

500 g of the reaction mixture described in Example 19 C were uniformly knife-coated onto a rigid polyethylene film. 100 g of glass fibers (average length 20 to 26 mm) were then pressed into this plastic mixture and any air still present was forced out by means of a roller. The rough sheet thus obtained was stored for 1 day, after which the preliminary reaction of the amine with the MDI-dimer to form the modified uret dione diisocyanate was finished, leaving a stiff paste. The rough sheet could subsequently be processed and hardened at any time by compression-forming at 120° C. (50 to 100 bars; 5 to 15 minutes). A highly elastic, stiff polyurethane filled with glass fibers was obtained.

Example 21

25 g of a diamine mixture of 2,4-diamino-3, 5-diethyl toluene and 2,6-diamino-3,5-diethyl toluene (approximately 80/20) were added at room temperature to a suspension of 192 g of MDI-dimer (n=0.1) in 500 g of toluene. This mixture was briefly stirred and then heated to 50° C. for 1 hour. The NCO-prepolymer formed from MDI-dimer and diamine was then filtered off under suction and washed to remove any toluene present. The NCO-content was about 11% (NCO-calculated 10.6%) which indicates that the diamine had reacted smoothly with MDI-dimer without splitting the uret dione ring.

217 g of the above-described urea-containing modified MDI-dione diisocyanate were thoroughly mixed with 500g of a linear polypropylene glycol ether (OH-number 56; molecular weight 2000). After the addition of 0.5 g of Pb-octoate and heating for 1 to 2 hours at 110° to 120° C. thermal crosslinking occurred. A polyurethane elastomer having mechanical properties comparable to those of the product of Example 19A was obtained.

Example 22

300 g of the suspension prepared in Example 5 were mixed with 18 g of 2,4-/2,6-diamino-3,5-diethyl toluene and 0.4 g of Pb-octoate. After a few hours, there was an increase in viscosity culminating in the formation of a paste which was still processible and storage stable at room temperature. After application to solid substrates, the paste could be hardened at any time by heat shock (120° C/30 min-1 hour) to form a highly elastic film.

Example 23

500 g of a linear polypropylene glycol ether (OH-number 28, molecular weight 4000) were mixed at room temperature with 105 g of MDI-dimer, 30 g of 4,4'-diamino-3,5-diethyl-3',5'-diisopropyl diphenyl methane and 0.5 g of Pb-octoate. There was an immediate increase in viscosity as a result of preliminary reaction of the diamine with MDI-dimer (modification reaction in the polyol). However, the reaction mixture was still pourable even after 24 hours and retained its consistency after that time. After heating at 110° C., a polyurethane material having the following mechanical properties was obtained:

| | |
|---|---|
| Hardness (A) | 52 |
| Tensile strength (MPa) | 6.0 |
| Breaking elongation (%) | 850 |
| Tear propagation resistance (KN/m) | 16 |
| Elasticity (%) | 40 |

Example 24

50 g of a finely divided polyurea produced from 1 mole of 1,6-diisocyanatohexane and 1 mole 1,6-diaminohexane in toluene were suspended in 500 g of the linear polypropylene glycol ether described in Example 11. 128 g of MDI-dimer and 0.5 g of Pb-octoate were then added to the thus-formed suspension. After heating for 3 hours at 110° to 120° C., an elastic molding having the mechanical properties indicated in Table VI was obtained.

Example 25

69 g of a polyurea produced from 1 mole of isophorone diisocyanate and 1 mole of isophorone diamine in toluene were suspended in 500 g of the linear polypropylene glycol ether described in Example 11. After the addition of 125 g of MDI-dimer and 0.5 g of Pb-octoate, the resulting mixture was processed and heated in the same way as described in Example 24 (for mechanical properties, see Table VI).

Example 26

A solution of 35 g of 4,4'-diisocyanato-diphenyl methane was added dropwise over a period of 50 to 60 minutes at room temperature to a solution of 28 g of 4,4'-diamino-diphenyl methane in 500 g of the polyether described in Example 11. 125 g of MDI-dimer and 0.5 g of Pb-octoate were added to the resulting suspension of the polyurea in the polyether. The mechanical properties of the molding made from this material by the procedure described in Example 24 are reported in Table VI.

Example 27

Example 26 was repeated with the exception that the proportion of polyurea was increased by reacting 56 g of 4,4'-diamino-diphenyl methane with 70 g of 4,4'-diisocyanato diphenyl methane. 128 g of MDI-dimer and 0.5 g of Pb-octoate were added to the highly thixotropic suspension and a molding was made from this material by the procedure described in Example 24. The mechanical properties of this molding are reported in Table 6.

Example 28

A mixed polyurea of 25 g of 2,4-/2,6-diamino-3,5-diethyl toluene (80/20 mixture) and 35 g of 4,4'-diisocyanato-diphenyl methane was prepared by the procedure described in Example 26 in 500 g of the polyether. This suspension was also highly thixotropic. However, 128 g of MDI-dimer and 0.5 g of Pb-octoate could still be mixed in with vigorous stirring. The mechanical properties of a molding made from this material by the procedure described in Example 24 are reported in Table VI.

Example 29

128 g of MDI-dimer and 0.5 g of Pb-octoate were added to a suspension of a polyurea prepared in situ from 17 g of 2,4-diaminotoluene and 24 g of 2,4-diisocyanato-toluene in 500 g of polyether. A molding was made from this material by the procedure described n Example 24. The mechanical properties of this molding are reported in Table VI.

Example 30

Example 29 was repeated with the exception that the proportion of polyurea was increased by reacting 34 g of 2,4-diaminotoluene and 48 g of 2,4-diisocyanato-toluene in the presence of; 500 g of polyether. The suspension had a viscosity of 4000 mPa at room temperature. 125 g of MDI-dimer and 0.5 hg of Pb-octoate were added to this mixture. A molding was made from this material by the procedure described in Example 24. The mechanical properties of this molding are reported in Table VI.

The combinations of polyethers, MDI-dimer and polyureas described in Examples 24 to 30 were storage stable at room temperature, i.e, they did not increase in viscosity. Hardening occurred only after heating from 4 to 6 hours at 110° to 120° C., resulting in the formation of highly elastic polyurethane elastomers having the properties reported in Table VI. These properties were determined by the testing techniques identified in Example 13.

TABLE VI

| Properties/Example No. | 24 | 25 | 26 | 27 | 28 | 29 | 30 |
|---|---|---|---|---|---|---|---|
| Hardness (Shore A) | 65 | 64 | 71 | 81 | 71 | 62 | 70 |
| Tensile strength (MPa) | 5.0 | 4.5 | 4.0 | 6.0 | 4.0 | 3.5 | 4.5 |
| Breaking elongation (%) | 125 | 130 | 120 | 120 | 100 | 100 | 125 |
| Elasticity (%) | 60 | 58 | 60 | 60 | 58 | 60 | 61 |
| Tear propagation resistance (KN/m) | 7.5 | 6.5 | 7.5 | 10.5 | 10.0 | 7.0 | 8.0 |

Example 31

500 g of an unbranched polyester of adipic acid and a 1:1 mixture of ethylene glycol and 1,4-butane diol (OH-number 56) were thoroughly mixed at 50° to 60° C. with 157.5 g of MDI-dimer, 11.5 g of 2,4-/2,6-diamino-3,5-diethyl toluene and 1.25 g of FOMREZ-UL 29 (an S-containing tin catalyst manufactured by the Witco Company). After cooling, the storage stable system was obtained in the form of a highly viscous paste. The paste thus obtained could be hardened at any time by heat shock (120° C.) and under pressure (50 to 100 bars) in molds. After heating for 10 to 20 minutes, an elastomer having the following properties (determined by the testing procedures identified in Example 13) was obtained.

| Hardness (A) | 83 |
|---|---|
| Tensile strength (MPa) | 15 |
| Breaking elongation (%) | 500 |
| Tear propagation resistance (KN/m) | 40 |
| Elasticity (%) | 52 |

Example 32

500 g of the polyester used in Example 31 were thoroughly mixed with 125 g of MDI-dimer. 1.25 grams of each of the catalysts shown in Table VII were added to such a mixture. The resultant viscous material was poured into a suitable mold and heated for 4 hours at 120° C. As can be seen from Table VII, distinct differences in the mechanical properties of the crosslinked products were found which differences were attributable to the effectiveness of the specific catalyst.

TABLE VII

| | Hardness (Shore A) | Tensile strength (MPa) | Breaking elongation (%) | Tear propagation resistance (KN/m) | Elasticity (%) |
|---|---|---|---|---|---|
| dibutyl-tin-IV-dithioester (FOMREZ UL, a Witco product) | 71 | 12.0 | 800 | 33 | 57 |
| dimethyl tin-IV-di(thioester) (FOMREZ UL 24, a Witco product) | 72 | 10.5 | 680 | 26 | 57 |
| dioctyl tin-IV-di(thioester) FOMREZ UL-29, a | 75 | 15.0 | 740 | 30 | 57 |

TABLE VII-continued

|  | Hardness (Shore A) | Tensile strength (MPa) | Breaking elongation (%) | Tear propagation resistance (KN/m) | Elasticity (%) |
|---|---|---|---|---|---|
| Witco Product) | | | | | |
| Pb-octoate | 63 | 6.0 | 400 | 11.5 | 55 |
| 1,4-diazabicyclo-(2,2,2)-octabe (Dabco) | 60 | 5.0 | 460 | 11.0 | 55 |

In the case of polyester polyols, Pb-octoate and Dabco were distinctly less favorable as catalysts than tin catalysts.

Example 33

500 g of a polycaprolactone (OH-number 56; molecular weight 2000) were mixed while heating (40° to 60° C.) with 12.5 g of ethylene glycol, 1.25 g of dioctyl tin-(IV)-di-(thioester), 222.5 g of MDI-dimer. After brief degassing, the still fluid reaction mixture could be poured into a mold in which it was subsequently heated at 110° C. to 120° C. After heating for 4 hours, an elastomer having the following properties (determined by the testing procedures identified in Example 13) was obtained:

| Hardness (A) | 88 |
|---|---|
| Tensile strength (MPa) | 18.5 |
| Breaking elongation (%) | 500 |
| Tear propagation resistance (KN/m) | 40 |
| Elasticity (%) | 55 |

This reaction mixture solidified at room temperature to form a wax-like system (softening range approximately 55° to 60° C.) which could then be processed under pressure in heated molds. Even after storage for 3 months, a high elastic molding could still be obtained.

Example 34

When the polycaprolactone mentioned in Example 33 was replaced by 500 g of a polyester of adipic acid and 1,4-butane diol (OH-number 56, molecular weight 2000), a polyurethane elastomer having the mechanical properties (determined by the test procedures identified in Example 13) given below was obtained:

| Hardness (A) | 91.0 |
|---|---|
| Tensile strength (MPa) | 20.5 |
| Breaking elongation (%) | 530 |
| Tear propagation resistance (KN/m) | 57 |
| Elasticity (%) | 52 |

This mixture solidified at room temperature to form a wax-like system which showed no change in its behavior over an observation period of 3 months.

Example 35

500 g of a solid polyester of adipic acid and ethylene glycol (OH-number 56; molecular weight 2000) were mixed while heating (50° to 70° C.) with 125 g of MDI-dimer and 1.25 g of dioctyl tin-(IV)-di-(thioester). After brief degassing, the resulting mixture was poured onto a substrate. After cooling, the solid system was granulated. The granulates thus obtained could be introduced at any time into a mold heated to 70°-100° C. After melting (60° to 80° C), the resultant highly viscous melt spread ut in the mold. The flow of this melt was dependent upon the temperature of the mold. Final hardening was carried out at a temperature of 140° to 120° C. The elastomer obtained had the following mechanical properties (determined by the test procedures identified in Example 13):

| Hardness (A) | 85 |
|---|---|
| Tensile strength (MPa) | 18.0 |
| Breaking elongation (%) | 700 |
| Tear propagation resistance (KN/m) | 28 |
| Elasticity (%) | 48 |

Example 36

260 g of the mixture described in Example 19 were thoroughly mixed with 25 g of petroleum ether and the resulting mixture was introduced into a metal mold measuring $20 \times 20 \times 1$ cc which mold had been cooled to room temperature. The mold was closed under a pressure of 160 kg/cm$^2$ and heated to 110° C. After 20 minutes, the mold was again cooled to room temperature. A fine-cell, elastic molding having a unit weight of approximately 700 kg/m$^3$ was obtained.

Example 37

(37a) 25 g of 2,4/2,6-diamino-3,5-diethyl toluene, 20 g of azo-bis-isobutyronitrile and 1.25 g of Pb-octoate were added to a dispersion of 150 g of MDI-dimer in 500 g of a branched polypropylene glycol ether (OH-number 35). The reaction mixture thus obtained was uniformly knife-coated onto a solid substrate and hardened at 120° to 140° C. After heating for 1 to 2 hours, a highly elastic foamed sheet-form structure was obtained. This mixture would, therefore, be suitable for use as a coating material for a number of different substrates.

(37b) Example (37a) was repeated using 20 g of N,N'-dimethyl-N,N'-dinitroso-terephthalomide instead of the azo-bis-isobutyronitrile. This mixture also yielded a highly elastic foamed sheet-form structure and would be useful as a coating material for a number of different substrates.

Example 38

(Comparison Example corresponding to British Patent No. 1,134,285)

500 g of molten diphenyl methane diisocyanate were added dropwise over a period of 1.5 hours to a mixture of 500 ml of H$_2$O, 5 g of tributyl phosphine and 10 g of an emulsifier (Mersolat ® H, a product of Bayer AG). As the reaction mixture foamed, a white deposit precipitated. After 3 to 4 hours, approximately 24 liters of CO$_2$ had been given off due to reaction of MDI with the H$_2$O. After the white deposit had been filtered off under suction and washed with acetone, the MDI-uret dione diisocyanate containing urea groups was obtained in the form of a white insoluble powder. The NCO-content calculated through the amine uptake amounted to 6.5%. A test specimen prepared in accordance with Example 13 remained uncrosslinked and liquid. High molecular weight MDI-uret dione derivatives containing urea groups of this type are not suitable for the application according to the invention.

Example 39

300 g of a linear polybutadiene containing OH-groups (molecular weight 2000, OH-number 56; Telechelic R 45 HT, an ARCO product) were thoroughly mixed with 125 g of dimeric diphenyl methane diisocyanate (n=0). After the addition of 0.7 g of a catalyst (dioctyl tin-(IV)-di-(thioester)), the reaction mixture was degassed in vacuo and then poured into a mold treated with a release agent. After heating for 2 hours at 120° C., an elastic molding having the following properties (determined by the test procedures identified in Example 13) was obtained:

| | | |
|---|---|---|
| Hardness (A) | 57 | |
| Tensile strength (MPa) | 3.2 | |
| Tear propagation resistance (KN/m) | 5.5 | |
| Breaking elongation (%) | 155 | |
| Elasticity (%) | 45 | |

This reactive mixture was storage stable for several months at room temperature.

Example 40

58 g of a 50% suspension of oligomeric diphenyl methane uret dione diisocyanate (n=0.35) in dioctyl phthalate were mixed with 100 g of a linear polypropylene glycol ether (molecular weight 2000), 1 g of 2,4-/2,6-diamino-3,5-diethyl toluene (80/20) and 0.2 g of lead octoate. After degassing in vacuo, the reaction mixture was poured into a waxed mold and heated for 2 hours at 110° to 120° C. A soft polyurethane elastomer having a Shore A hardness of 40 and an elasticity of 35% was obtained.

Example 41

60 g of a diphenyl methane uret dione diisocyanate having an NCO-content of 15.1% (n=1.1) were mixed with 40 g of a high molecular weight diphenyl methane uret dione (NCO-content 4.7%, n=3.6-i.e above the limits of the invention). 46 g of this mixture were added to 100 g of a linear polypropylene glycol ether having a molecular weight of 2000. Only the free NCO-content of the oligomer with n=1.1 was taken into account in calculating the equivalence with respect to the OH-groups of the polyether. The relatively high molecular weight fractions (n=3.6) acted largely as a filler and made a slight contribution to the stiffness of the polyurethane elastomer. After 0.2 g of lead octoate had been added and the reaction mixture degassed at room temperature, it was poured into a suitable mold. After heating for 2 to 4 hours at 110° to 120° C., a polyurethane elastomer having a Shore A hardness of 65 was obtained.

What is claimed is:

1. A storage stable, low molecular weight, substantially water free heterogeneous composition which may be hardened to form a polyurethane by exposure to heat comprising:
   (a) one OH-equivalent of difunctional or polyfunctional polyhydroxyl compounds having a molecular weight from 1,000 to 10,000;
   (b) (i) 0.8 to 1.5 NCO-equivalents of 4,4'-diphenyl methane uret dione diisocyanates corresponding to the formula:

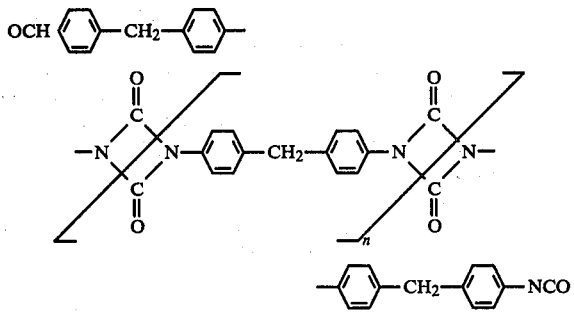

in which n=0 to 2.5 or
   (ii) 0.8 to 12 NCO-equivalents of a 4,4'-diphenyl methane uret dione diisocyanate modified by a difunctional or polyfunctional compound containing OH-groups attached to aliphatic and/or cycloaliphatic groups and/or aromatic NH$_2$-groups which modifying compound has a molecular weight from 62 to 400; and
   (c) 0.001 to 5 wt. % (based on (a)+(b)) of a lead and/or tin catalyst.

2. The heterogeneous composition of claim 1 further comprising 0 to 2.5 wt. % based on the composition as a whole of finely divided polyadduct of a polyisocyanate and a compound having a molecular weight from 32 to 400 which contains at least two isocyanate-reactive groups which polyadduct has an average particle size from 1 to 7 μm.

3. The heterogeneous composition of claim 1 further comprising auxiliaries and/or additives known to be useful in making polyurethanes.

4. The heterogeneous composition of claim 1 in which a catalyst known to catalyze polyurethane formation reactions other than component (c) is also used.

5. The heterogeneous composition of claim 1 comprising:
   (a) one OH-equivalent of a difunctional or polyfunctional polyether or polyester having a molecular weight in the range from 1250 to 6000;
   (b) (i) 0.8 to 1.5 NCO-equivalents of a 4,4'-diphenyl methane uret dione diisocyanate in which n=0.1 to 1.5 or
   (ii) 0.8 to 12 NCO-equivalents of a 4,4'-diphenyl methane uret dione in which n=0.1 to 1.5 modified by a diol in which the hydroxyl groups are attached to aliphatic and/or cycloaliphatic groups and/or an aromatic diamine having a molecular weight of from 62 to 400; and
   (c) 0.01 to 2 wt. % lead and/or tin catalyst.

6. The heterogeneous composition of claim 5 in which a catalyst other than component (c) known to be useful in polyurethane forming reactions is also included.

7. The heterogeneous composition of claim 5 which further comprises from 2.5 to 12.5 wt. % finely-divided hydrazine and/or dihydrazide compound and a diol having a molecular weight from 32 to 400.

8. The heterogeneous composition of claim 1 wherein component (a) is a polyether polyol and component (c) is 0.01 to 2 wt. % lead salt catalyst.

9. The heterogeneous composition of claim 8 which further comprises a tertiary amine catalyst.

10. The heterogeneous composition of claim 1 wherein component (a) is a polyester polyol and component (c) is 0.01 to 2 wt. % tin salt catalyst.

11. The heterogeneous composition of claim 10 which further comprises a tertiary amine catalyst.

12. A process for the production of a storage-stable, low molecular weight, substantially water free heterogeneous composition which composition may be hardened to form a polyurethane by exposure to heat comprising:
(a) mixing one equivalent of a difunctional or polyfunctional hydroxyl compound having a molecular weight from 1,000 to 10,000 with
(b) m (1 to 1.5)+(0.8 to 1.5) NCO-equivalents of
 (i) a 4,4'-diphenyl methane uret dione diisocyanate corresponding to the formula

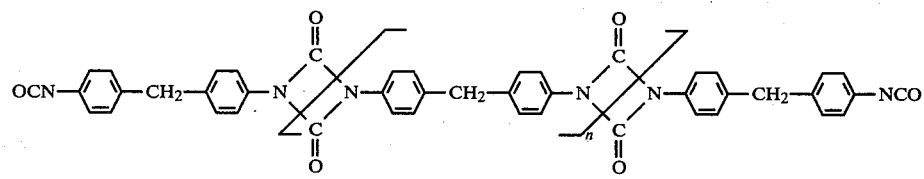

in which n represents a number from 0 to 2.5 or
 (ii) a 4,4'-diphenyl methane uret dione diisocyanate modified by m-equivalents of a difunctional or a polyfunctional low molecular weight compound for each OH-equivalent of (a) wherein the low molecular weight compound contains OH-groups attached to aliphatic or cycloaliphatic groups and/or aromatic NH$_2$-groups and has a molecular weight of from 62 to 400,
where m represents a number greater than 0 but less than or equal to 7 amd n=0 to 2.5 in the presence of
(c) 0.01 to 5 wt. % (based on (a) +(b)) of a lead and/or tin catalyst.

13. The process of claim 12 wherein the modified 4,4'-diphenyl methane uret dione diisocyanate (ii) was prepared by reacting m OH- and/or NH$_2$-equivalents of the low molecular weight compound with m (1 to 1.5)+(0.8 to 1.5) NCO-equivalents of 4,4'-diphenyl methane uret dione diisocyanate (i) which diisocyanate is in the form of a finely-divided powder having an average particle size from 1 to 7 μm.

14. The process of claim 12 wherein the composition also includes a standard catalyst different from component (c) which standard catalyst is useful in the production of polyurethanes.

15. The process of claim 12 wherein the composition includes 0 to 25 wt. % (based on the composition as a whole) of a finely-divided polyadduct of a polyisocyanate and at least one compound containing two or more NCO-reactive groups and having a molecular weight in the range from 32 to 400.

16. The process of claim 12 wherein the composition includes other auxiliary agents and additives commonly used in the production of polyurethanes.

17. The process of claim 12 wherein the composition is made from
(a) a polyhydroxyl compound having from 2 to 4 OH-groups and a molecular weight from 1250 to 6,000,
(b) (i) a 4,4'-diphenyl methane uret dione diisocyanate corresponding to the formula in which n=0.1 to 1.5 and m is as defined in claim 12 or
 (ii) a 4,4'-diphenyl methane uret dione diisocyanate (0<m<7) modified by m-equivalents of an aliphatic diol and/or a cycloaliphatic diol and/or an aromatic diamine having a molecular weight in the range from 60 to 400 and
(c) 0.01 to 2 wt. % (based on (a)+(b)) of a lead and/or tin catalyst.

18. The process of claim 17 wherein the composition is prepared in situ by dispersing the 4,4'-diphenyl methane uret dione diisocyanate (b) (i) in the polyhydroxyl compound (a) in a manner such that m OH-and/or NH$_2$-equivalents of diol and/or diamine are reacted with m (1 to 1.5)+(0.8 to 1.5) NCO-equivalents of diisocyanate (b) (i).

19. The process of claim 17 wherein 2.5 to 12.5 wt. % of a polyadduct of a diisocyanate and a compound selected from the group consisting of diamines, hydrazine, dihydrazide compounds, diols having a molecular weight from 32 to 400 and mixtures thereof are included in the mixture.

20. The process of claim 12 wherein m (1 to 1.5)+(0.8 to 1.5) NCO-equivalents of a modified 4,4'-diphenyl methane uret dione diisocyanate which has been modified by the external reaction of m equivalents of a low molecular weight diol and/or aromatic diamine with m (1 to 1.5)+(0.8 to 1.5) NCO-equivalents of a 4,4'-diphenyl methane uret dione diisocyanate (b) (i) corresponding to the formula in which n=0.1 to 1.5 is employed.

21. The process of claim 12 wherein a di-, tri- and/or tetrafunctional polyether polyol is used as component (a).

22. The process of claim 21 wherein a lead salt is used as catalyst (c).

23. The process of claim 22 wherein a tertiary amine catalyst is also employed.

24. The process of claim 12 wherein a di-, tri- and/or tetrafunctional polyester polyol having a melting point above room temperature is used as component (a).

25. The process of claim 24 wherein catalyst (c) is a tin catalyst.

26. The process of claim 25 wherein a tertiary amine catalyst is also employed.

27. The process of claim 25 wherein the mixing is carried out at a temperature above the melting point of the polyester polyol.

28. The process of claim 27 wherein the product is cooled and put into granular form.

29. A polyurethane plastic made by heating the composition of claim 1 to a temperature above 100° C.

* * * * *